US009163586B2

(12) United States Patent
Johnson

(10) Patent No.: US 9,163,586 B2
(45) Date of Patent: Oct. 20, 2015

(54) EXHAUST SYSTEM HAVING PARALLEL EGR COOLERS

(71) Applicant: Electro-Motive Diesel, Inc., Lagrange, IL (US)

(72) Inventor: Steven Dallas Johnson, Naperville, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 318 days.

(21) Appl. No.: 13/756,132

(22) Filed: Jan. 31, 2013

(65) Prior Publication Data

US 2014/0209073 A1 Jul. 31, 2014

(51) Int. Cl.
*F02M 25/07* (2006.01)
*F02B 37/00* (2006.01)
(Continued)

(52) U.S. Cl.
CPC .............. *F02M 25/07* (2013.01); *F02B 37/001* (2013.01); *F02B 37/004* (2013.01); *F02B 37/007* (2013.01); *F02B 37/013* (2013.01); *F02B 37/16* (2013.01); *F02M 25/0707* (2013.01);
(Continued)

(58) Field of Classification Search
CPC .............. F02M 25/07; F02M 25/0727; F02M 25/0707; F02M 25/0745; F02M 25/0749; F02M 25/0751; F02M 25/0711; F02M 25/0726; F02M 25/0732; F02B 37/001; F02B 37/004; F02B 37/007; F02B 37/013; F02B 37/16
USPC ........................ 123/568.12, 568.11, 562, 569; 60/605.2, 612, 602; 73/861.64
See application file for complete search history.

(56) References Cited

U.S. PATENT DOCUMENTS 4,400,945 A * 8/1983 Deutschmann et al. ........ 60/612
5,517,976 A 5/1996 Bächle et al.
(Continued)

FOREIGN PATENT DOCUMENTS

DE 197 17 846 11/1998
EP 1072765 6/2010
(Continued)

OTHER PUBLICATIONS

Dr. Johannes Kech et al., "Exhaust Gas Recirculation: Internal Engine Technology for Reducing Nitrogen Oxide Emissions", Engine Technology, MTU Friedrichshafen GmbH, www.mtu-online.com (Aug. 2011).

(Continued)

*Primary Examiner* — Lindsay Low
*Assistant Examiner* — George Jin
(74) *Attorney, Agent, or Firm* — Finnegan, Henderson, Farabow, Garrett & Dunner, LLP

(57) ABSTRACT

An exhaust system is disclosed for use with an engine. The exhaust system may have a first exhaust manifold associated with a first plurality of engine cylinders, and a second exhaust manifold associated with a second plurality of engine cylinders. The exhaust system may also have a first exhaust gas recirculation passage extending from the first exhaust manifold to the first plurality of engine cylinders, and a second exhaust gas recirculation passage extending from the first exhaust manifold to the second plurality of engine cylinders. The exhaust system may additionally have a first cooler located in fluid communication with the first exhaust gas recirculation passage, and a second cooler located in fluid communication with the second exhaust gas recirculation passage.

18 Claims, 2 Drawing Sheets

(51) Int. Cl.
  *F02B 37/007* (2006.01)
  *F02B 37/013* (2006.01)
  *F02B 37/16* (2006.01)

(52) U.S. Cl.
  CPC ....... *F02M25/0711* (2013.01); *F02M 25/0727* (2013.01); *F02M 25/0749* (2013.01); *Y02T 10/121* (2013.01)

(56) References Cited

U.S. PATENT DOCUMENTS

| | | | |
|---|---|---|---|
| 5,671,600 | A | 9/1997 | Pischinger et al. |
| 6,082,100 | A | 7/2000 | Boegner et al. |
| 6,945,235 | B1* | 9/2005 | Bertilsson et al. ....... 123/568.11 |
| 6,973,787 | B2* | 12/2005 | Klingel ........................... 60/612 |
| 7,921,830 | B2* | 4/2011 | Schneider et al. ....... 123/568.17 |
| 7,941,999 | B2 | 5/2011 | Kasper et al. |
| 8,919,121 | B2* | 12/2014 | Schlemmer-Kelling ..... 60/605.2 |
| 2004/0194463 | A1* | 10/2004 | Yanagisawa et al. ........ 60/605.2 |
| 2006/0042247 | A1* | 3/2006 | Haugen ........................... 60/612 |
| 2007/0039314 | A1 | 2/2007 | Mizuguchi |
| 2008/0060624 | A1 | 3/2008 | Grandas |
| 2008/0216475 | A1* | 9/2008 | Kasper et al. ................ 60/605.2 |
| 2009/0084193 | A1* | 4/2009 | Cerabone et al. ........... 73/861.64 |
| 2010/0146965 | A1* | 6/2010 | Easley et al. .................... 60/602 |
| 2011/0253113 | A1 | 10/2011 | Roth et al. |
| 2011/0302919 | A1* | 12/2011 | Schlemmer-Kelling ..... 60/605.2 |
| 2012/0078492 | A1 | 3/2012 | Freund et al. |
| 2014/0331978 | A1* | 11/2014 | Goetzke et al. .......... 123/568.12 |

FOREIGN PATENT DOCUMENTS

| | | |
|---|---|---|
| GB | 2 093 909 | 9/1982 |
| JP | 2007/23920 | 2/2007 |
| WO | WO 2010/116064 | 10/2010 |
| WO | WO 2012/069376 | 5/2012 |

OTHER PUBLICATIONS

U.S. Patent Application of Keith A. Moravec et al., entitled "Engine System with Passive Regeneration of a Filter in EGR Loop" filed on Jan. 31, 2013.

U.S. Patent Application of Keith A. Moravec et al., entitled "Engine System for Increasing Available Turbocharger Energy" filed on Jan. 31, 2013.

* cited by examiner

EXHAUST SYSTEM HAVING PARALLEL EGR COOLERS

TECHNICAL FIELD

The present disclosure is directed to an exhaust system and, more particularly, to an exhaust system having parallel exhaust gas recirculation (EGR) coolers.

BACKGROUND

Combustion engines such as diesel engines, gasoline engines, and gaseous fuel-powered engines are supplied with a mixture of air and fuel for combustion within the engine that generates a mechanical power output and a flow of exhaust gases. The exhaust gases can include a complex mixture of air pollutants produced as byproducts of the combustion process. And, due to increased attention on the environment, the amount of pollutants emitted to the atmosphere from an engine can be regulated depending on the type of engine, size of engine, and/or class of engine.

One method that has been implemented by engine manufacturers to comply with the regulation of exhaust emissions includes utilizing an exhaust gas recirculation (EGR) circuit. EGR circuits operate by recirculating a portion of the exhaust produced by the engine back to the intake of the engine to mix with fresh combustion air. The resulting mixture, when ignited, produces a lower combustion temperature and a corresponding reduced amount of regulated pollutants.

An exemplary turbocharged engine implementing exhaust gas recirculation is disclosed in a technical article titled "Engine Gas Recirculation: Internal engine technology for reducing nitrogen oxide emissions" by MTU Friedrichshafen GmbH that published in August of 2011 ("the technical article"). In particular, the technical article discloses an internal combustion engine having a plurality of cylinders arranged into two different banks. Both banks of cylinders are provided with compressed air from a three-turbocharger arrangement (i.e., a high-pressure turbocharger and parallel low-pressure turbochargers). One of the banks of cylinders discharges exhaust to the turbochargers, while the other bank is considered a donor bank and discharges exhaust for recirculation within the engine. A single EGR cooler is mounted to the top of the engine for cooling exhaust from the donor bank of cylinders before the exhaust is distributed to all cylinders for subsequent mixing with air and combustion. A first control valve is located upstream of the EGR cooler and used to control EGR flow rates, while a second control valve is located in a bypass and used to selectively direct excess exhaust from the donor bank of cylinders to the turbochargers.

Although the exhaust system of the technical article may provide for reduced emissions in some applications, it may still be less than optimal. In particular, because exhaust gas is only distributed to the different banks of cylinders from a location downstream of the EGR cooler and EGR control valve, these components may be relatively large and difficult to package. For example, the single large EGR cooler mounted to the top of the engine may be cumbersome and limit applicability. In addition, the number of control valves used by the system may increase cost and control complexity of the engine. Further, the location of the EGR control valve upstream of the cooler may create an extreme environment for the control valve that can lead to excessive wear and premature failure of the valve.

The disclosed exhaust system is directed to overcoming one or more of the problems set forth above and/or other problems of the prior art.

SUMMARY

In one aspect, the present disclosure is directed toward an exhaust system for an engine. The exhaust system may include a first exhaust manifold associated with a first plurality of engine cylinders, and a second exhaust manifold associated with a second plurality of engine cylinders. The exhaust system may also include a first exhaust gas recirculation passage extending from the first exhaust manifold to the first plurality of engine cylinders, and a second exhaust gas recirculation passage extending from the first exhaust manifold to the second plurality of engine cylinders. The exhaust system may additionally include a first cooler located in fluid communication with the first exhaust gas recirculation passage, and a second cooler located in fluid communication with the second exhaust gas recirculation passage.

In another aspect, the present disclosure is directed a method of handling exhaust from an engine. The method may include directing exhaust from a first plurality of engine cylinders to a turbocharger, and directing a first flow of exhaust from a second plurality of engine cylinders back into the first plurality of engine cylinders. The method may also include directing a second flow of exhaust from the second plurality of engine cylinders back into the second plurality of engine cylinders, cooling the first flow of exhaust, and cooling the second flow of exhaust separately from the first flow of exhaust.

DETAILED DESCRIPTION

Figure 1:
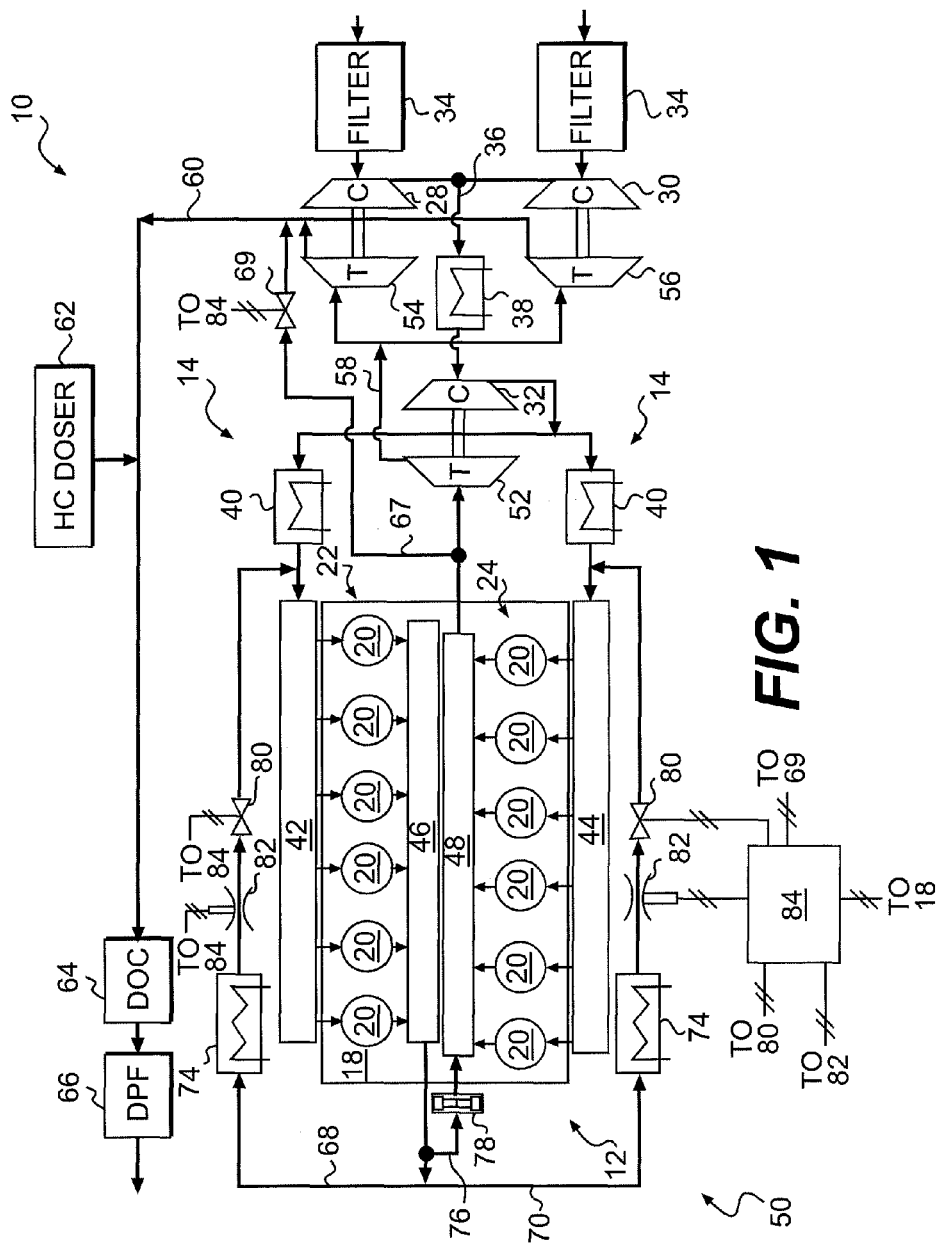
FIG. 1 is a schematic illustration of an exemplary disclosed power system.

FIG. 1 illustrates a power system 10 having a power source 12, an air induction system 14, and an exhaust system 16. For the purposes of this disclosure, power source 12 is depicted and described as a four-stroke diesel engine. One skilled in the art will recognize, however, that power source 12 may be any other type of combustion engine such as, for example, a two- or four-stroke gasoline or gaseous fuel-powered engine. Air induction system 14 may be configured to direct air or a mixture of air and fuel into power source 12 for combustion. Exhaust system 16 may be configured to direct combustion exhaust from power source 12 to the atmosphere.

Power source 12 may include an engine block 18 that at least partially defines a plurality of cylinders 20. A piston (not shown) may be slidably disposed within each cylinder 20 to reciprocate between a top-dead-center position and a bottom-dead-center position, and a cylinder head (not shown) may be associated with each cylinder 20. Each cylinder 20, piston, and cylinder head may together at least partially define a combustion chamber. In the illustrated embodiment, power source 12 includes twelve cylinders 20 arranged in a V-configuration (i.e., a configuration having first and second banks 22, 24 or rows of cylinders 20). However, it is contemplated that power source 12 may include a greater or lesser number of cylinders 20 and that cylinders 20 may be arranged in an inline configuration, in an opposing-piston configuration, or in another configuration, if desired.

Air induction system 14 may include, among other things, at least one compressor and at least one air cooler located to cool air compressed by the compressor before it enters the combustion chambers of power source 12. Each compressor may embody a fixed geometry compressor, a variable geometry compressor, or any other type of compressor configured to receive air and compress the air to a desired pressure level. In the disclosed exemplary embodiment, air induction system 14 has three compressors, including first and second low-pressure compressors 28, 30 disposed in parallel, and a high-pressure compressor 32 disposed downstream of first and second low-pressure compressors 28, 30. First and second low-pressure compressors 28, 30 may draw air through a corresponding filter 34, compress the air to a first pressure level, and direct the pressurized air to high-pressure compressor 32 via a passage 36. High-pressure compressor 32 may receive the pressurized air from low-pressure compressors 28, 30 and increase the pressure thereof to a higher level. A common first cooler 38 may be located in fluid communication with passage 36 to chill the air pressurized by both first and second low-pressure compressors 28, 30 before it is received by high-pressure compressor 32. Additional coolers 40 may be disposed downstream of high-pressure compressor 32 (e.g., one cooler 40 between high-pressure compressor 32 and each of first and second intake manifolds 42, 44) to further chill the air before it enters the combustion chambers of power source 12. First intake manifold 42 may be associated with first bank 22 of cylinders 20, while second intake manifold 44 may be associated with second bank 24.

Exhaust system 16 may include, among other things, at least one turbine driven by the exhaust from power source 12 to rotate the compressors of air induction system 14. Each turbine may embody a fixed geometry turbine, a variable geometry turbine, or any other type of turbine configured to receive exhaust and convert potential energy in the exhaust to a mechanical rotation. In the disclosed exemplary embodiment, exhaust system 16 has three turbines, including a high-pressure turbine 52, and first and second low-pressure turbines 54, 56 disposed in parallel at locations downstream of high-pressure turbine 52. Exhaust system 16 may also include a first exhaust manifold 46 and a second exhaust manifold 48 in separate communication with first and second banks 22, 24 of cylinders 20. High-pressure turbine 52 may receive exhaust from second bank 24 of cylinders 20 via second exhaust manifold 48, remove a portion of the potential energy contained therein, and then distribute the exhaust to low-pressure turbines 54, 56 by way of a passage 58. After exiting low-pressure turbines 54, 56, the exhaust may be discharged to the atmosphere via a common passage 60. One or more exhaust treatment devices, for example a hydrocarbon doser 62, a diesel oxidation catalyst (DOC) 64, a diesel particulate filter (DPF) 66, and/or any other treatment device known in the art may be disposed within passage 60, if desired.

In some embodiments, a bypass passage 67 may be provided to selectively allow exhaust from second exhaust manifold 48 to bypass the turbines of exhaust system 16 and flow directly into passage 60. A control valve 69 may be disposed within bypass passage 67 to regulate the rate of exhaust flow through bypass passage 67. By regulating this bypassing flow of exhaust, operation of high- and low-pressure turbines 52-56 may be more tightly controlled.

Exhaust system 16 may also include an exhaust gas recirculation (EGR) circuit 50 configured to selectively divert exhaust to air induction system 14 from a location upstream of high-pressure turbine 52. In particular, EGR circuit 50 may be fluidly connected at a first end with only first exhaust manifold 46 and at an opposing second end with air induction system 14. In the disclosed exemplary embodiment, EGR circuit 50 includes two parallel passages 68, 70 that extend from an end of first exhaust manifold 46 along opposing sides of power source 12 to separately connect to first and second intake manifolds 42, 44 at locations within air induction system 14 that are downstream of high-pressure compressor 32 (and downstream of coolers 40). Separate and substantially identical exhaust coolers 74 may be located within each of passages 68, 70 to cool exhaust passing therethrough.

Coolers 74 may each be any type of heat exchanger known in the art that is configured to cool exhaust flowing through EGR circuit 50. For example, coolers 74 may each be an air-to-liquid type of heat exchanger that receives coolant from and returns coolant to power source 12 (e.g., engine block 18). The coolant may be passed through spaced apart channels within each cooler 74 and used to absorb heat from exhaust passing through adjacent channels. It should be noted that one or both of coolers 74 may alternatively be another type of heat exchanger, if desired, such as an air-to-air heat exchanger.

In some embodiments, a bypass passage 76 may be provided to selectively allow exhaust from first exhaust manifold 46 to bypass EGR circuit 50 and flow into second exhaust manifold 48 to join the exhaust passing through turbines 52-56. A valve 78 may be disposed within bypass passage 76 to help regulate a pressure within first exhaust manifold 46 and EGR circuit 50. Valve 78 may be a fixed restrictive orifice, a movable pressure-regulated valve (e.g., a spring-biased check valve), or another type of valve known in the art. By regulating this bypassing flow of exhaust, the pressure of exhaust gas recirculated within power source 12 may be more tightly controlled.

Additional elements may be associated with power system 10 for use in controlling exhaust gas recirculation. Specifically, exhaust system 16 may include a recirculation control valve 80 located within each of passages 68, 70, at least one flow measuring device 82 associated with one or both of passages 68, and 70 (or alternatively associated with first exhaust manifold 46), and a controller 84 in communication with recirculation control valves 80 and flow measuring device(s) 82. Controller 84 may be configured to regulate operation of recirculation control valves 80 based on input from flow measuring device(s) 82 and/or other input associated with operation of power source 12.

Recirculation control valve 80 may be any type of valve known in the art such as, for example, a butterfly valve, a diaphragm valve, a gate valve, a ball valve, a poppet valve, or a globe valve. Each recirculation control valve 80 may be solenoid-actuated, hydraulically-actuated, pneumatically-actuated or actuated in any other manner by controller 84 to selectively restrict and/or completely block the flow of exhaust through fluid passageways 68, 70.

Each measuring device 82, in the disclosed exemplary embodiment, includes one or more sensing elements (e.g., two pressure sensors or a single differential pressure sensor) mounted within a venturi. Signals generated by the sensing element(s) may be used as an indication of a flow rate of exhaust through EGR circuit 50. Although shown as being located within each of passages 68, 70, it is contemplated that only one measuring device 82 may alternatively be included and located within only one of fluid passages 68, 70 or in first exhaust manifold 46, if desired. It is also contemplated that a different type of measuring device may be included, if desired.

Figure 2:
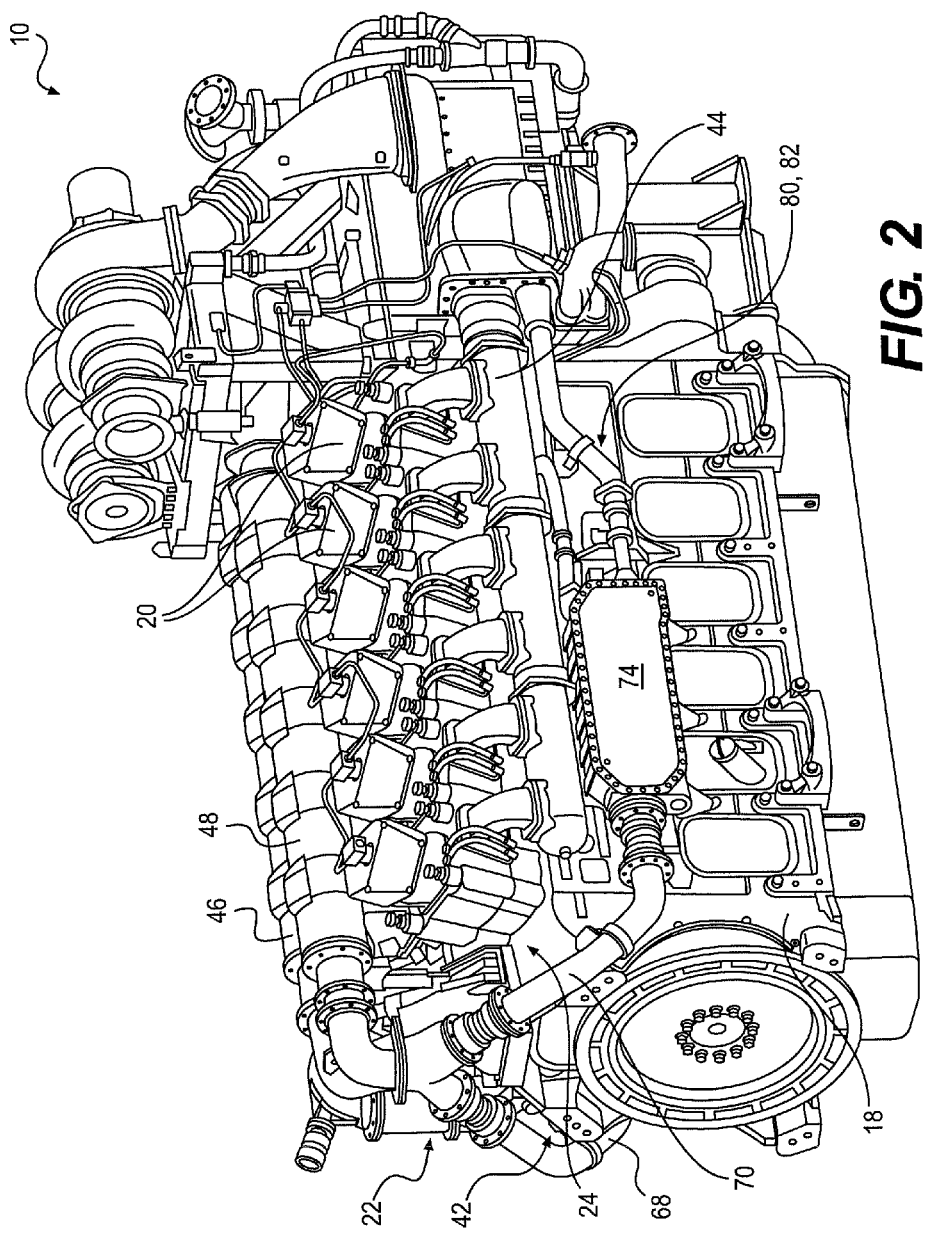
FIG. 2 is an isometric illustration of the power system of FIG. 1.

Controller 84 may embody a single microprocessor or multiple microprocessors that include a means for controlling an operation of power system 10. Numerous commercially available microprocessors can be configured to perform the functions of controller 84. It should be appreciated that controller 84 could readily be embodied in a general machine microprocessor capable of controlling numerous machine functions. Controller 84 may include a memory, a secondary storage device, a processor, and any other components for running an application. Various other circuits may be associated with controller 84 such as power supply circuitry, signal conditioning circuitry, solenoid driver circuitry, and other types of circuitry FIG. 2 illustrates a particular physical embodiment of power system 10. In this embodiment, first and second intake manifolds 42, 44 are located at sides of power source 12 and extend in a length direction of engine block 18, while first and second exhaust manifolds 46, 48 are located at a top side of engine block 18, between cylinders 20. Passages 68, 70 fork at one end of first and second manifolds 42, 44, and wrap downward and around the sides of engine block 18. In this configuration, coolers 74 are mounted to engine block 18 at locations below first and second intake manifolds 46, 48. These locations may provide protection for coolers 74, while at the same time making for an overall compact package.

Industrial Applicability

The disclosed exhaust system may be implemented into any power system application where charged air induction and exhaust gas recirculation are utilized. The disclosed exhaust system may be simple and robust, and offer, because of its compact size, enhanced application opportunities. Specifically, use of a non-controlled valve (e.g., valve 78) to regulate pressures within first exhaust manifold 46 and/or EGR circuit 50 may help to reduce control complexity of power system 10. In addition, the location of control valves 80 and measuring devices 82 downstream of coolers 74 may result in a more temperate environment and extended life for these components. Finally, the location of coolers 74 at the sides of power source 12 may allow for packaging within applications having low overhead clearance.

The use of donor cylinders within power system 10 may also enhance performance. That is, because exhaust recirculated within power system 10 may only be provided by first bank 22 of cylinders 20 (and not by second bank 24 that communicates with turbines 52-56), the performance of turbines 52-56 may be tuned for high-performance without instabilities caused by periodic and/or changing recirculation demands.

Power system 10 may also have improved control over exhaust gas recirculation. In particular, because each of passages 68, 70 may be provided with control equipment (e.g., control valve 80 and measuring device 82), unique control strategies may be available. In particular, it may be possible to provide disproportionate exhaust gas recirculation to different banks 22, 24 of cylinders 20. For example, a greater or lesser restriction on exhaust flow within passage 68 may be provided, as compared to passage 70. In this situation, first bank 22 of cylinders 20 may donate a corresponding greater or lesser amount of recirculated exhaust, as compared with second bank 24. This situation may be exploited to obtain low exhaust emissions and yet high turbocharger efficiency (or other similar goals).

It will be apparent to those skilled in the art that various modifications and variations can be made to the disclosed exhaust system. Other embodiments will be apparent to those skilled in the art from consideration of the specification and practice of the disclosed exhaust system. It is intended that the specification and examples be considered as exemplary only, with a true scope being indicated by the following claims and their equivalents.

What is claimed is:

1. An exhaust system for an engine, comprising:
   a first exhaust manifold associated with a first plurality of engine cylinders;
   a second exhaust manifold associated with a second plurality of engine cylinders;
   a first exhaust gas recirculation passage extending from the first exhaust manifold to the first plurality of engine cylinders;
   a second exhaust gas recirculation passage extending from the first exhaust manifold to the second plurality of engine cylinders;
   a first cooler located in fluid communication with the first exhaust gas recirculation passage; and
   a second cooler located in fluid communication with the second exhaust gas recirculation passage a bypass passage extending from the first exhaust manifold to the second exhaust manifold; and a valve disposed within the bypass passage and configured to selectively pass exhaust from the first exhaust manifold to the second exhaust manifold.

2. The exhaust system of claim 1, further including:
   a first control valve disposed within the first exhaust gas recirculation passage at a location downstream of the first cooler; and
   a second control valve disposed within the first exhaust gas recirculation passage at a location downstream of the second cooler.

3. The exhaust system of claim 2, further including:
   a first venturi disposed within the first exhaust gas recirculation passage;
   a first sensor associated with the first venturi;
   a second venturi disposed within the second exhaust gas recirculation passage; and
   a second sensor associated with the second venturi.

4. The exhaust system of claim 3, wherein:
   the first venturi is located between the first cooler and the first control valve; and
   the second venturi is located between the second cooler and the second control valve.

5. The exhaust system of claim 3, further including a controller in communication with the first sensor, the first control valve, the second sensor, and the second control valve, the controller being configured to regulate operation of the first and second control valves based on signals from the first and second sensors.

6. The exhaust system of claim 5, wherein the first and second sensors are pressure sensors configured to generate signals indicative of flow rates through the first and second exhaust gas recirculation passages.

7. The exhaust system of claim 1, wherein:
   the first plurality of engine cylinders includes all engine cylinders located within a first bank of engine cylinders; and
   the second plurality of engine cylinders includes all engine cylinders located within a second bank of engine cylinders.

8. The exhaust system of claim 1, wherein the first and second exhaust gas recirculation passages extend from the first exhaust manifold to first and second intake manifolds of the engine at locations downstream of an associated compressor.

9. The exhaust system of claim 8, further including a turbine connected to drive the compressor that supplies air to the first and second pluralities of engine cylinders, wherein the second exhaust manifold extends from the second plurality of engine cylinders to the turbine.

10. The exhaust system of claim 9, wherein:
the turbine is a high-pressure turbine;
the compressor is a high-pressure compressor;
the turbine and the compressor form a high-pressure turbocharger;
the exhaust system further includes:
- a first low-pressure turbine connected to drive a first low-pressure compressor; and
- a second low-pressure turbine connected to drive a second low-pressure compressor;

the high-pressure turbine is disposed upstream of the first and second low-pressure turbines; and
the first and second low-pressure turbines are disposed in parallel.

11. The exhaust system of claim 10, further including at least one exhaust treatment device disposed within a common passage downstream of the first and second low-pressure turbines.

12. The exhaust system of claim 11, further including:
a bypass passage extending from upstream of the high-pressure turbine to the common passage; and
a bypass valve disposed within the bypass passage.

13. The exhaust system of claim 1, wherein:
the engine includes an engine block; and
the first and second coolers are mountable at different sides of the engine block.

14. The exhaust system of claim 13, wherein the first and second coolers are configured to communicate coolant with the engine block.

15. A power system, comprising:
an engine block at least partially defining a first bank of cylinders and a second bank of cylinders;
a first intake manifold mounted at a first side of the engine block and in fluid communication with the first bank of cylinders;
a second intake manifold mounted at a second side of the engine block and in fluid communication with the second bank of cylinders;
a first exhaust manifold mounted between the first and second banks of cylinders and in fluid communication with the first bank of cylinders;
a second exhaust manifold mounted between the first and second banks of cylinders and in fluid communication with the second bank of cylinders;
a high-pressure turbocharger fluidly connected to the second exhaust manifold and to the first and second intake manifolds;
a first low-pressure turbocharger fluidly connected to the high-pressure turbocharger;
a second low-pressure turbocharger fluidly connected to the high-pressure turbocharger;
a first exhaust gas recirculation passage extending from the first exhaust manifold to the first intake manifold;
a second exhaust gas recirculation passage extending from the first exhaust manifold to the second intake manifold;
a first cooler mounted to a first side of the engine block below the first intake manifold and fluidly connected with the first exhaust gas recirculation passage; and
a second cooler mounted to a second side of the engine block below the second intake manifold and fluidly connected with the second exhaust gas recirculation passage.

16. A method of handling exhaust from an engine, comprising:
directing exhaust from a first plurality of engine cylinders to a turbocharger;
directing a first flow of exhaust from a second plurality of engine cylinders back into the first plurality of engine cylinders;
directing a second flow of exhaust from the second plurality of engine cylinders back into the second plurality of engine cylinders;
cooling the first flow of exhaust; and
cooling the second flow of exhaust separately from the first flow of exhaust selectively directing exhaust from the first plurality of engine cylinders to join exhaust from the second plurality of engine cylinders.

17. The method of claim 16, further including:
measuring a rate of at least one of the first and second flows of exhaust; and
selectively adjusting a restriction on the at least one of the first and second flows of exhaust based on the rate.

18. The method of claim 16, further including selectively directing exhaust from the second plurality of engine cylinders to by bypass the turbocharger.

* * * * *